United States Patent [19]

Jakob

[11] Patent Number: 5,542,527
[45] Date of Patent: Aug. 6, 1996

[54] FLEXIBLE JOINTING DEVICE FOR CONVEYOR BELT

[75] Inventor: Horst Jakob, Deaux, France

[73] Assignee: ASER, Saint-Chamond, France

[21] Appl. No.: 379,678

[22] PCT Filed: Jun. 20, 1994

[86] PCT No.: PCT/FR94/00741

§ 371 Date: Feb. 8, 1995

§ 102(e) Date: Feb. 8, 1995

[87] PCT Pub. No.: WO95/00774

PCT Pub. Date: Jan. 5, 1995

[30] Foreign Application Priority Data

Jun. 21, 1993 [FR] France .................................. 93 07454

[51] Int. Cl.⁶ .................................................. B65G 15/34
[52] U.S. Cl. ............................................................ 198/844.2
[58] Field of Search .......................... 198/844.2; 24/33 P, 24/33 B, 33 K, 33 R

[56] References Cited

U.S. PATENT DOCUMENTS

| | | | |
|---|---|---|---|
| 2,916,136 | 12/1959 | Lombs | 24/33 K X |
| 4,024,605 | 5/1977 | Henke | 198/844.2 X |
| 4,344,209 | 8/1982 | Harwood | 198/844.2 X |
| 4,671,403 | 6/1987 | Schick | 198/844.2 |
| 5,048,675 | 9/1991 | Nadalutti | 198/844.2 |

FOREIGN PATENT DOCUMENTS

| | | | |
|---|---|---|---|
| 0158427 | 1/1953 | Australia | 198/844.2 |
| 917596 | 1/1947 | France . | |
| 1013901 | 8/1952 | France . | |
| 1065983 | 6/1954 | France . | |
| 1140516 | 7/1957 | France . | |
| 1195056 | 11/1959 | France . | |
| 1222376 | 6/1960 | France . | |
| 1278029 | 11/1961 | France | 198/844.2 |
| 205625 | 5/1971 | France . | |
| 2116609 | 7/1972 | France . | |
| 2901752 | 7/1980 | Germany . | |
| 1100597 | 1/1968 | United Kingdom | 198/844.2 |

*Primary Examiner*—James R. Bidwell
*Attorney, Agent, or Firm*—Browdy and Neimark

[57] ABSTRACT

The joining device comprises two halves of a joining device made up of a flexible and elastic material each one comprising a pair of flexible wings (4). These wings are fixed to the conveyor belt (6) by rivets (10). A frame (5) extends into the wings (4) and in the part of the joining device which constitutes the joining itself. The frame (5) is trimmed to washers (10) or to small plates (8) used as reinforcement for the fixing holes. A linking stem is threaded across through holes or passages provided in the linking elements.

14 Claims, 14 Drawing Sheets

FIG. 1a
FIG. 1b
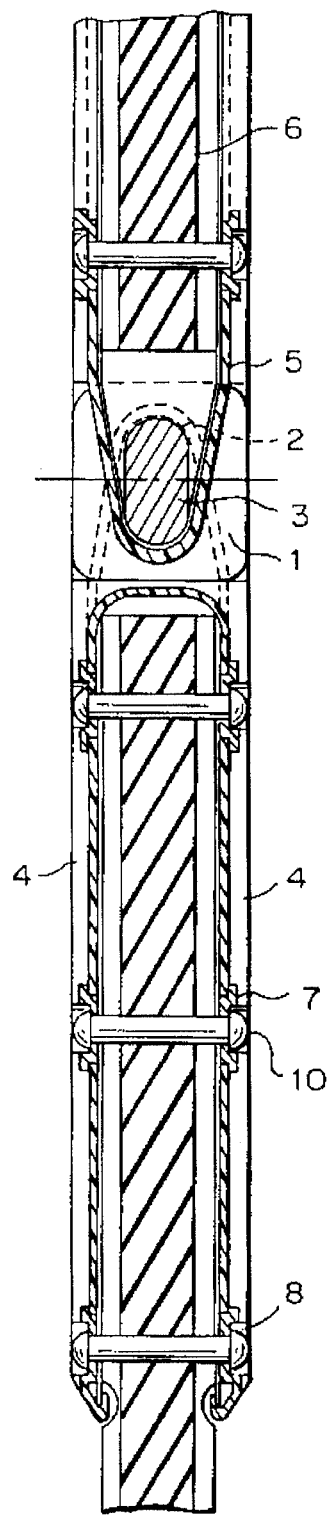
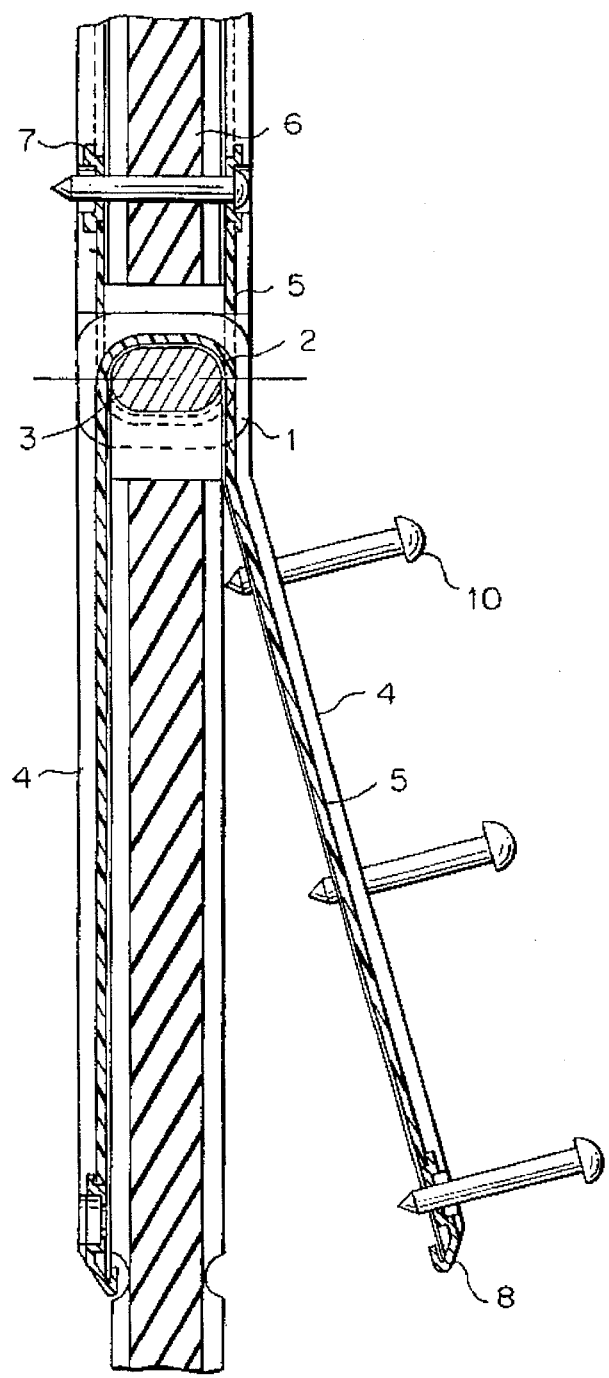

FIG. 11a
FIG. 11b
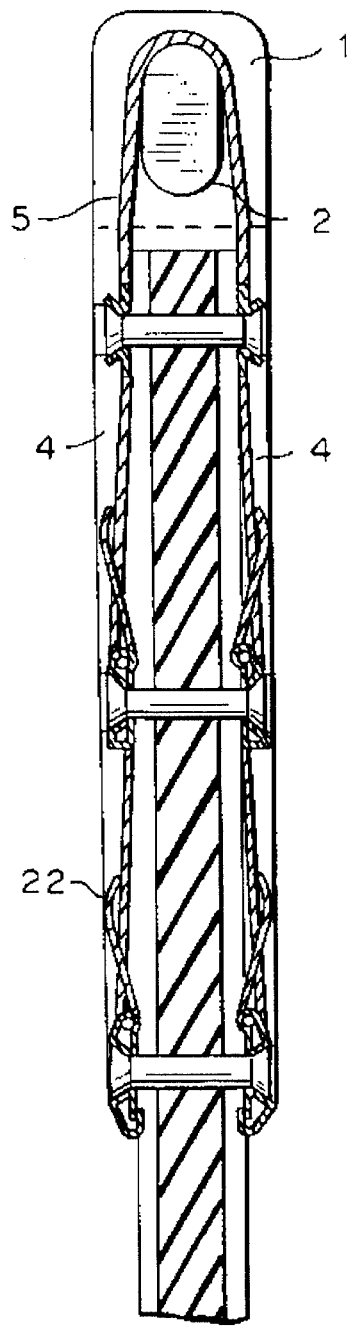
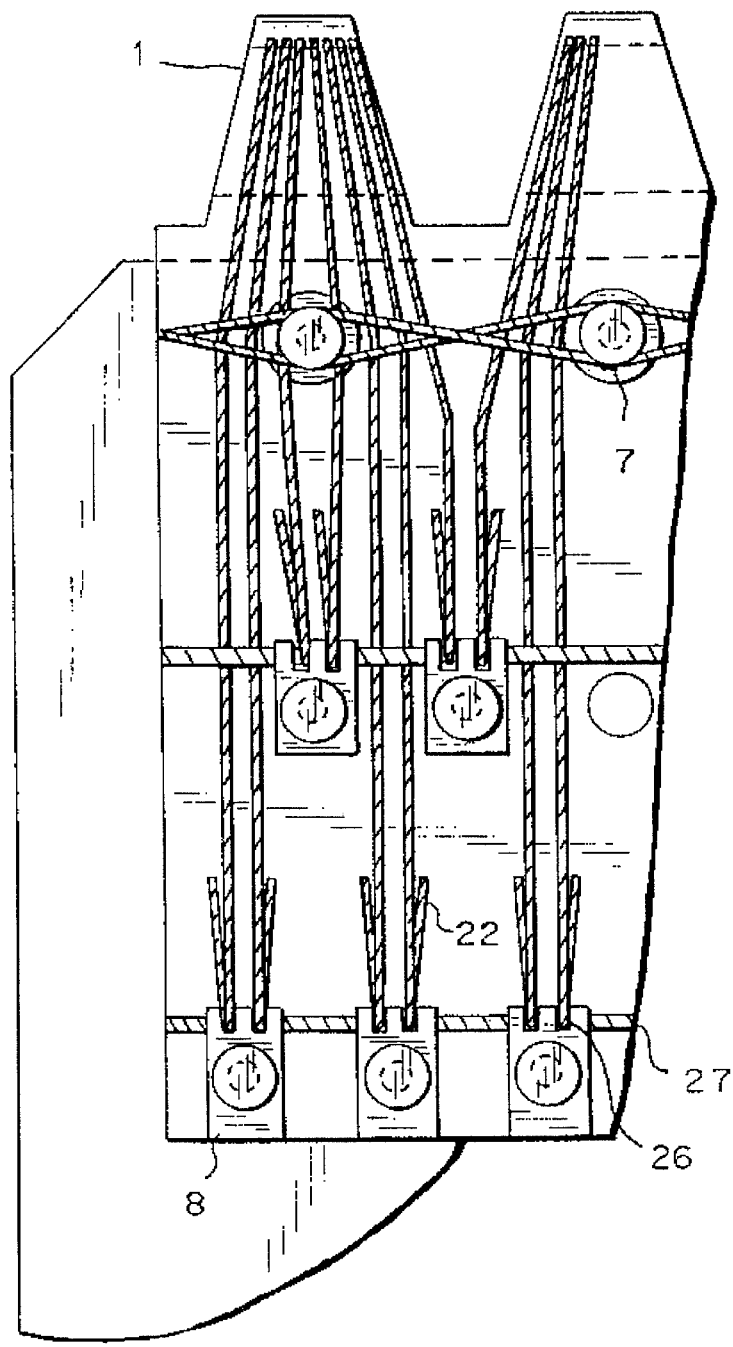

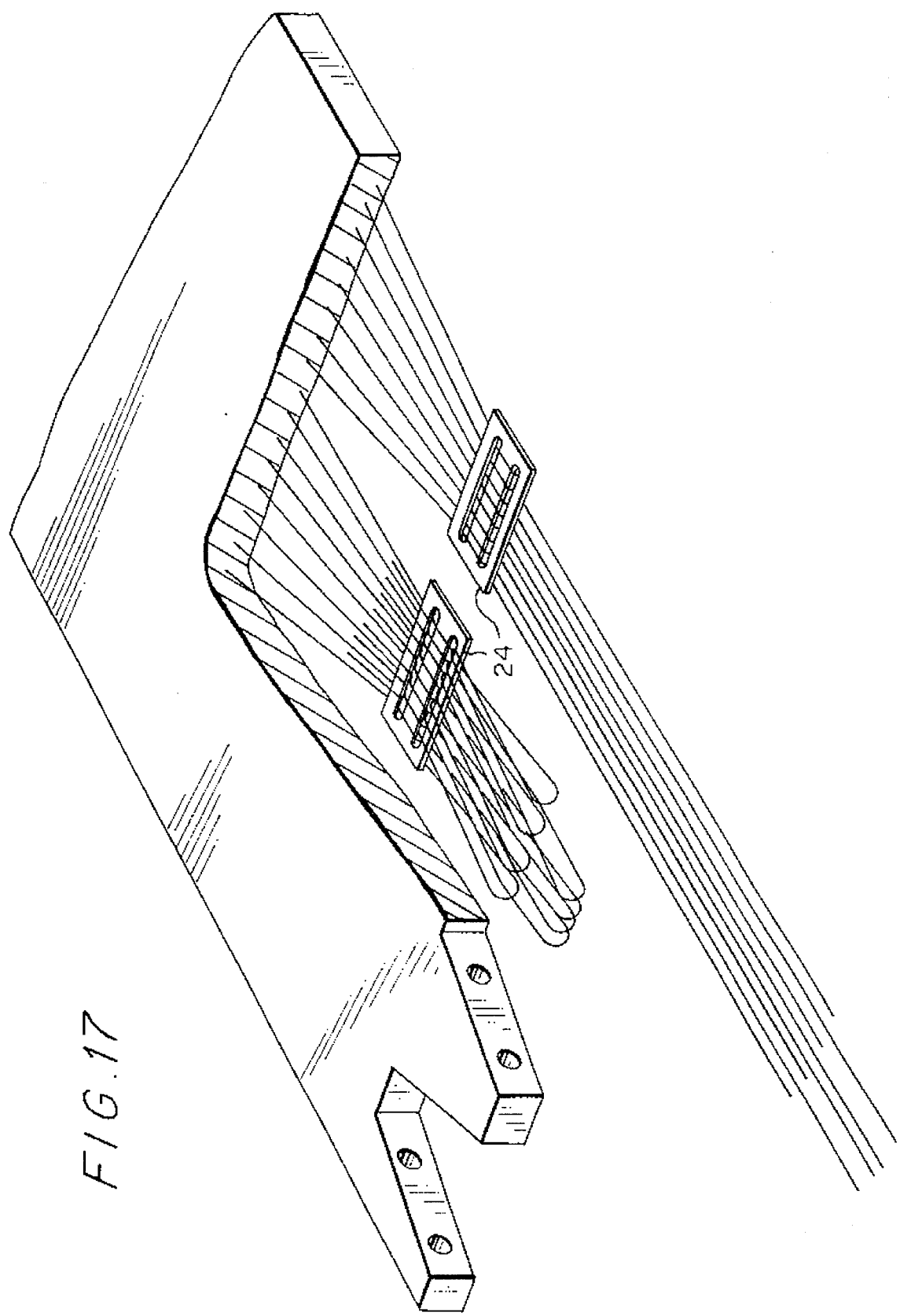

FLEXIBLE JOINTING DEVICE FOR CONVEYOR BELT

BACKGROUND OF THE INVENTION

1. Technical Field

The invention is directed to a flexible joining device for use with conveyor belts.

2. Prior Art

Conveyor belts are used in various industries for carrying materials and matters, generally, but not necessarily, in bulk form. Most often these conveyor belts are made up of a flexible material, having a certain elasticity, at least in the longitudinal direction, and they require the junction of the two ends, to constitute an endless conveyor belt, which passes around rollers, at least one of them being a driving roller the other one being generally a free roller known as idle roller.

In what concerns the methods of joining these conveyor belts, two main families are known hitherto.

A first family consists in sticking or vulcanizing the conveyor belt ends, when the band or the belt contains a large proportion of rubber. The operating conditions for presenting these ends and the operating conditions for carrying out the sticking or the vulcanization of these ends, one to the other, are well known by the men of the art.

The other family of joining methods makes use of joining devices consisting in a series of rigid metallic staples, usually U-shaped, each comprising two fixing lugs and an eyelet at their internal concave part, thus forming a so-called knuckle, similar to hinges. The fixing lugs of these rigid staples are attached to one end of the conveyor belt, one of them being fixed on one of the end faces of the conveyor belt, the other one on the other end face of the conveyor, by means of rivets or by means of spikes, often dual type spikes the sharp-pointed free ends of which are turned down after crossing matching holes, one of the lugs, the band and the other lug, then projecting from this latter.

The first family of joining methods, suffers of the major inconvenience resulting from the length of the operations, requiring a rather long shut-down, which may last up to 24 hours, and on the other hand from the difficulty often encountered in the hard running conditions (prevailing in transport of materials, and certain production industries) detrimental to a proper performance of the preparation of the ends. Furthermore, these junctions are not detachable. The possibility of carrying out a disconnection is useful, if a conveyor belt device has to be lengthened, which is often the case in mines, in quarries and in public works, along with the advance of the mine working face, the quarries works of the public works. Also, an easy disconnection enables an easy replacement of a piece of worn or damaged belt, the remaining pieces being usable.

In the case of the second family of joining methods, the operation can be faster and require a less careful preparation of the conveyor belt ends. However these junctions present major drawbacks which consist essentially in two problems. The first one lies in the fact that the linking and hinging axis is worn by the staples which are hinged upon it, and rotate with respect to it, during the running of the conveyor belt. This is unavoidable owing to the inherent design of the joining devices. Some corrective measures have been envisaged in order to obviate such wear, but these measures are either inefficient, or they increase considerably the cost, while they are far from totally effective.

The second problem encountered with the method of joining according to the second family, results from tears in the belt ends caused by the nails or points positioned rather close to the extremity of the belt ends. Due to their stiffness, the fixing lugs of the staples must be short in order to match more or less with the curve of the belt when the latter moves over a roller (either driving or idle), thus requiring as mentioned hereabove the location of the points or the rivets, rather close to the ends of the belt. Moreover, owing to this stiffness, the points are submitted to hard tensions, the path of the lug located on the roller side being shorter than the path of the lug located on the external side. The hard tensions which are supported by the points owing to the stiffness of the fixing lugs, cause the slow tear of the conveyor belt by the rivet or spike stem which crosses through the belt, and the failure of the junction.

OBJECT AND SUMMARY OF THE INVENTION

The object of the present invention is a joining device having all the advantages of both families and none of their inconveniences, i.e.

- the joining is carried out fast;
- the joining device is not subject to wear;
- it should be flexible and elastic during the passage of the band over the idle rollers;
- preferably it should be tight;
- it must not cause the tear of the belt at the fixing points;
- it should present a minimum overthickness with respect to the conveyor belt faces, thus being less sensitive to the scrapers used to clear the conveyor belt from the material wastes carried over;
- it should be detachable.

It is to be noted that the properties aimed at by the invention, concerning the novel method of joining, are properties found partly in the known joining devices of the first family and partly of those of the second family, although the devices according to both of the known families, do not present the whole of the properties which are incompatible within the same known family.

The problems of the prior art methods are solved by means of a joining device for conveyor belt presenting linking elements aligned on the external edge of each one of the two halves of the joining device, each one being solidly attached to a respective end of a conveyor belt: the linking elements are arranged to receive linking stems transversally threaded alternately, across a linking element belonging to one half of the joining device they then cross a linking element belonging to the other half of the joining device and so on. The halves of the joining devices are brought close together in order to interleave the linking elements belonging to one half of the joining device, to the linking elements belonging to the other half of the joining device. The joining device according to the invention is characterised by the fact:

that it is made up of a flexible material;

that it comprises an internal frame of the same range of flexibility and elasticity as that of the said material, and the said frame is designed to surround the recesses of the linking elements crossed through by the linking stems, either at a certain distance from the surface or these latter of flushing with this surface. The recesses may be lined with a ring or a plug either metallic or in plastic material to facilitate the threading across the linking stems.

According to a preferred embodiment of the invention, each linking element is provided with one single passage or through hole for one linking stem. This through hole has no round transversal cross section, for instance of a "racecourse" shape. The linking stem has a transversal cross-section of complementary shape, with a slight gap therebetween. This no round shape is aimed to prevent the operation of the joining device as a hinge, as in the case of the devices comprising stiff staples, according to the prior previous art, since these staples are quickly worn out. Other no-round shapes could be envisaged provided they prevent the rotation of the linking elements with respect to the linking stem during the operation of the conveyor belt. Although the joining device, according to the invention, is not hinged at the linking elements, this shortcoming is compensated by the flexibility and the elasticity of the material and by that of the frame surrounding the passages.

According to another preferred embodiment of the invention, each linking element is provided with two or several through holes, the link being obtained by means of two or several linking stems. In this case, the linking stems may have either a round shaped or a non-round shaped transversal cross-section, since the provision of at least two stems prevents the hinge effect, even with round shaped transversal cross-section stems. The through holes may be shifted in the longitudinal direction as well as in the direction perpendicular to the general plane of the joining device. The through holes are advantageously surrounded by parts of the frame of the joining device, in order to transmit the tensions to the frame and therefrom to the whole of the joining device and to the conveyor belt solidly attached to the joining device.

In what concerns the solid attachment of the joining device to the conveyor belt ends, two main methods are envisaged according to the invention. The first method of solid attachment to the conveyor belt according to the invention consists in the fact that each one of the halves of the joining device constitutes a single unit with the conveyor belt end, the frame of the joining device being the extension in the joining device of at least a part of the conveyor belt frame. These joining devices are obtained by overcasting or overvulcanization at least a part of the conveyor belt frame projecting beyond the conveyor belt and arranged adequately in a mould.

According to a second method for a solid attachment each half of the joining device is provided with two wings, a lower wing and an upper wing with the frame extending therebetween. These wings, formed as a single unit with the part of the joining device comprising the linking elements, are flexible and elastic, particularly in the longitudinal direction, on account of the elasticity of their constituents and of those of the frame. For fixing the said wings on one end of the conveyor belt, the wings are arranged on each side of the conveyor belt end which is thus located between the two wings. Rivets or spikes are forced into holes formed in the said fixing wings by crossing through the end of the conveyor sandwiched between the two fixing wings.

The holes, which are advantageously lined by means of washers, are distributed over the fixing wings, in such a way as the rivets or spikes are not arranged in longitudinal alignment, or if such is the case they should be set apart along a large distance.

It has to be underlined that since the wings of the joining devices, according to the invention, are flexible and extend over the whole width of the joining devices, they can largely extend in the longitudinal direction without hampering the operation of the device. This arrangement enables the setting of the rivets or spikes largely apart from each other, this being quite different from the prior art, where rigid individual staples are used, with necessarily short fixing lugs, which in spite of that, and due to their stiffness cause tears to the conveyor belt end, because of the difference of radius, during the passage of the joining device over the idle rollers of the conveyor belt, between the upper face and the lower face of the joining device.

Advantageously, the frames are trimmed to the washers located inside the holes used for the passage of the rivets or spikes for fixing the halves of the joining devices. These washers could be replaced by small plates provided with openings, in particular at the free ends of the wings. These small plates, in which the frames are wedged, are advantageously folded externally, in order to form a tapered edge. These tapered edges are useful for protecting the ends of the wings against the attacks of the scrapers when these latter are used for clearing the conveyor belt from the material wastes. Effectively, without this tapered edge, the end of the wing projects from the plane of the corresponding surface of the conveyor belt, due to the thickness of the wing.

BRIEF DESCRIPTION OF THE DRAWINGS

Other embodiments of the invention are described hereafter by way of non limitative examples, in conjunction with the drawing in which same pieces or parts, or similar pieces or parts, carry the same references all over the Figures.

FIG. 1a shows a longitudinal cross-section, of a joining device according to the invention, used on the conveyor belt with the joining device completely fixed; and FIG. 1b shows the device of FIG. 1a with the joining device in the course of attachment;

FIGS. 11a and 11b respectfully represent a transversal cross-section (FIG. 11b) and a longitudinal cross-section (FIG. 11b) of a device showing a particular method of attachment of the frame cables, to the small fixation plates embedded in the wings of the joining device according to the invention;

FIG. 17 is a perspective view of a particular method of trimming of the ends of the frame loops surrounding the through holes provided for the linking stems.

DETAILED DESCRIPTION OF THE PREFERRED EMBODIMENT(S) OF THE INVENTION

Figure 2:
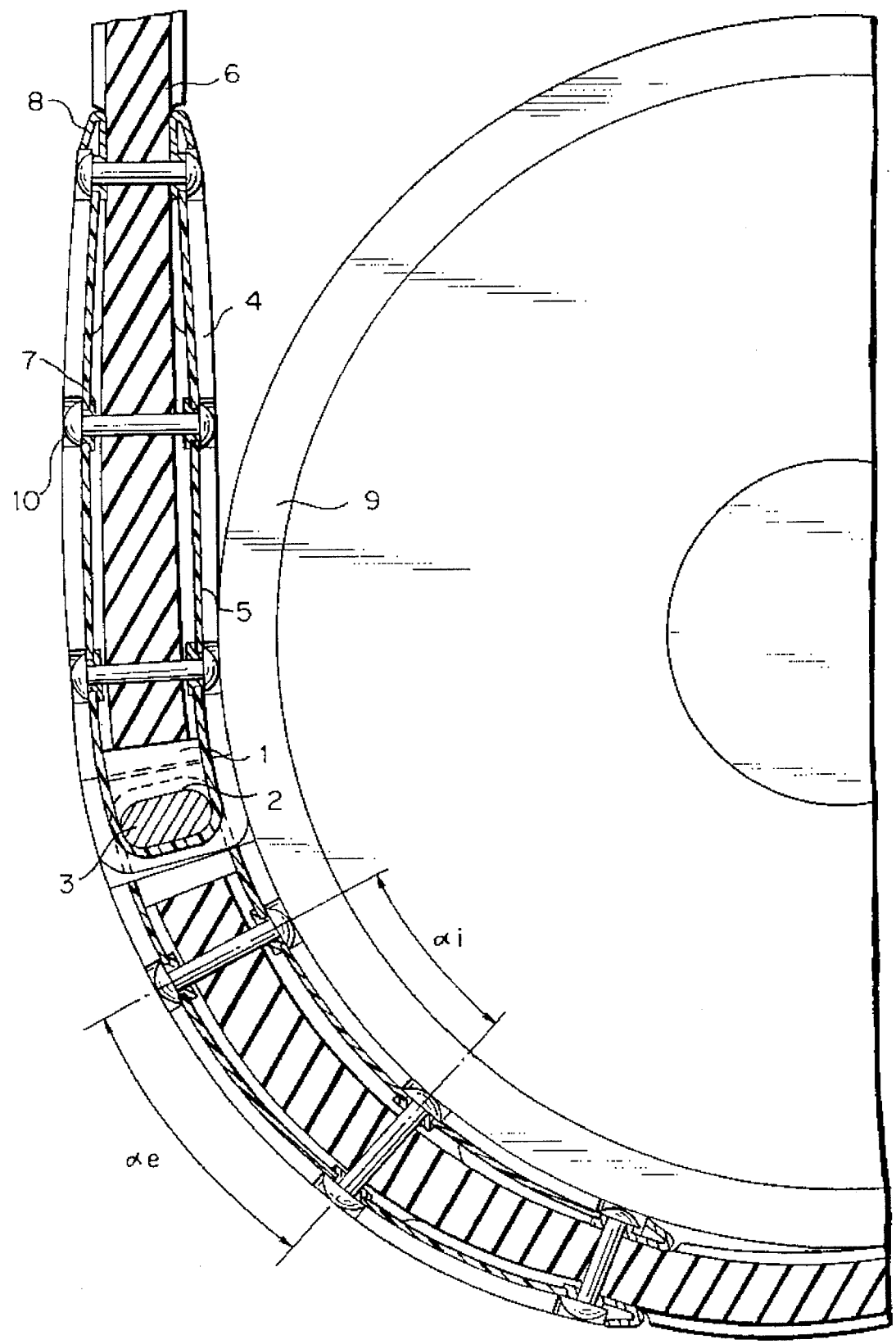
FIG. 2 represents a longitudinal cross-section of a joining device according to the invention during its passage over one of the rollers around which the conveyor belt is mounted.

In the joining device shown on FIG. 1, it can be observed that the linking stem 3 is threaded across the passages 2 formed in the linking elements 1, one of them being shown on the Figure. The halves of the joining systems, comprise two wings 4, of which is arranged against a face of one of the ends of a conveyor belt and fixed by means of rivets 10 crossing successively a wing, the conveyor belt 6 and the other wing. The joining devices of the two halves are provided with a flexible and elastic reinforcement or frame 5 linked to washers 7 and to small plates 8, embedded in the wings and providing for the passage of the rivets or spikes, to attach the wings on the end of the conveyor belt. The cross-section of the linking stem 3 is elongated with a "race-course" shape, i.e. a non-round shape.

This linking stem 3 is not intended, as for the known devices, both for linking and hinging of the two halves of the joining devices. According to the present invention the stem is used only for the attachment. The matching of the device to the cylindrical shape of the rollers on which runs the conveyor belt attached to the device, is obtained thanks to the flexibility and to the elasticity of the fixation wings of the device and of the linking elements.

In the whole of the description, the terms longitudinal direction and transversal direction mean respectively the length direction and the width direction of the conveyor belt, even when these terms are applied to the device and even if this latter is unequipped and supposed to have already been fixed to the conveyor belt. For the sake of clearness of the drawings, it has to be noted that the wings have been draught intentionally thicker than the thickness of the belt with respect to the drawing scale. Actually, these wings which are reinforced by a frame and provided with a large number of widely distributed fixing holes are much thinner, without reducing their resistance in course of operation of the device.

FIG. 2 shows two characteristics of the devices according to the invention. A joining device according to the invention is shown on the drawing fixed to the ends of a conveyor belt, during its passage over a supporting roller 9. The first characteristic appearing on the drawing is the flexibility of the device, in particular that of the wings 4 which match with the cylindrical form of the roller 9, exactly in the same way as the conveyor belt 6. The second characteristic shown on the drawing is the elasticity of the wings 4, in the longitudinal direction. Effectively, the arc $\alpha_e$ is slightly longer than the arc $\alpha_i$, this difference resulting from the difference of radius equal to the band thickness increased by that of the two wings. This difference in length between the external and internal arcs, would result, should the wings were not elastic in the longitudinal direction, in a tension stress transmitted to the fixing spikes or rivets 10, entailing in the long run the wear and tear of the conveyor belt wings. After the passage on the roller 9, and naturally owing to the elasticity of the wings 4, the external wing recovers its normal length, identical to that of the internal wing, since the tension stress is no longer present. The reason for the provision of an internal reinforcement or frame 5, is thus clearly understood, the elasticity of the frame being sufficient to compensate the length difference during the passage on rollers or under other similar circumstances. It is desirable that the elasticity of reinforcement or frames 5 and that of the material of the device should be identical or at least close to each other in order to obtain a lasting sticking of the frame and of the material.

Figure 3:
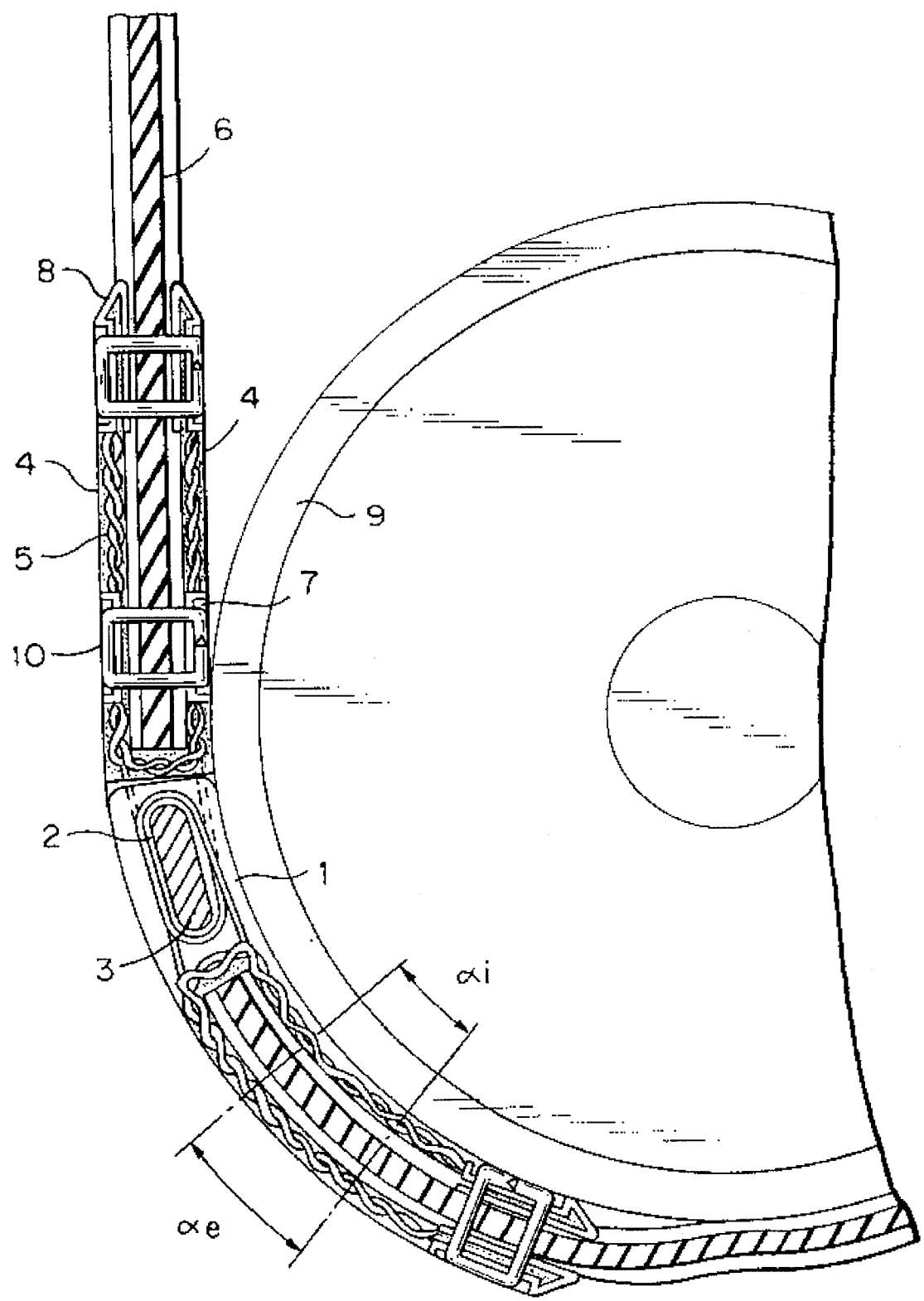
FIG. 3 is a view similar to that of FIG. 2, but showing another embodiment of the joining device according to the invention, in the same situation as the one shown on FIG. 2.

FIG. 3 shows what has been mentioned hereabove, concerning FIG. 2, applied to a device according to the invention, the internal frame of which is made of an elastic weaving fixed by means of dual point spikes, whereas the device shown on FIG. 2 has an internal frame 5 made of metallic or synthetic material cables and fixed by means of rivets.

Figure 4:
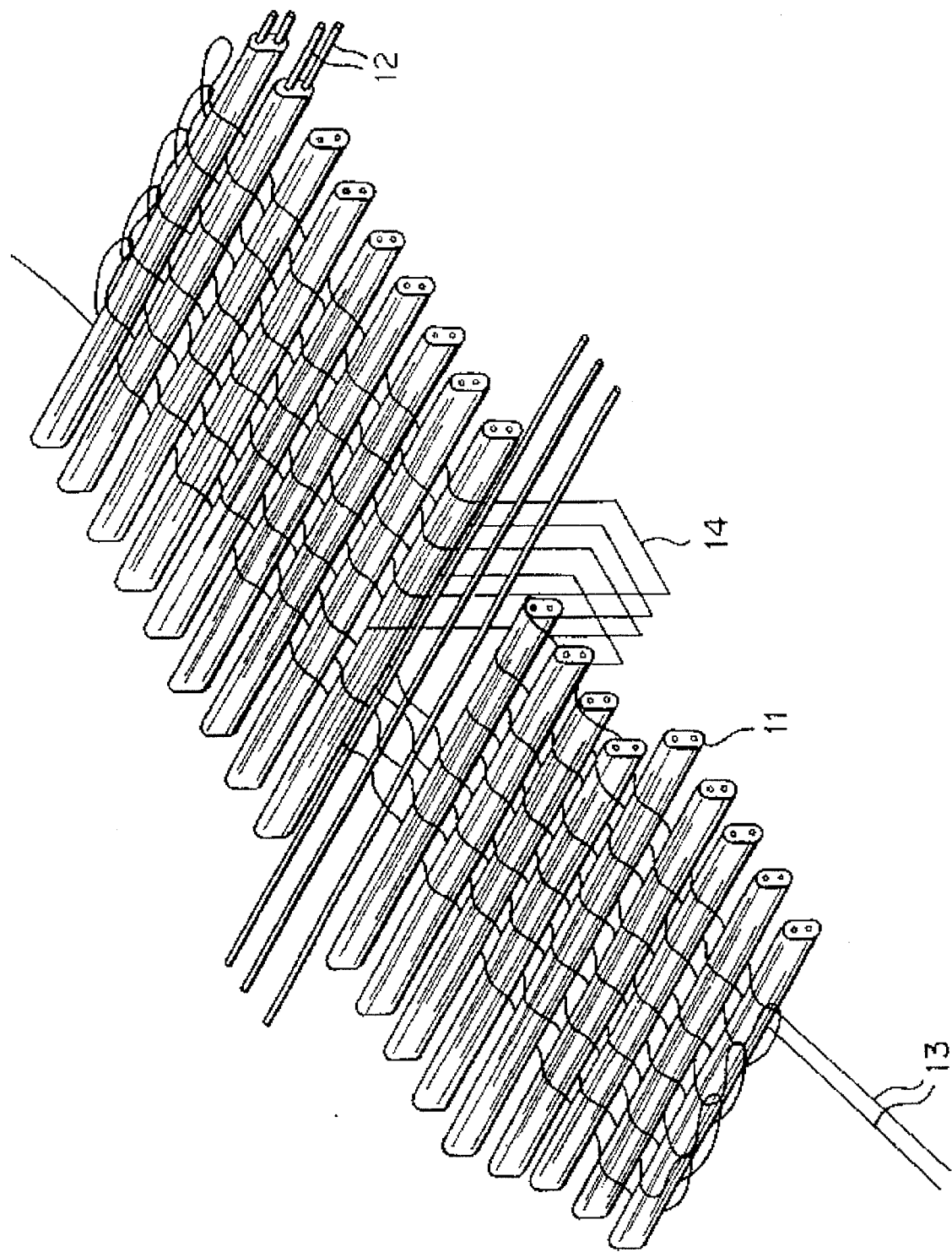
FIG. 4 is a schematic perspective view, of a method of weaving the frame of a joining device, according to the invention.

FIG. 4 shows an embodiment of the elastic woven reinforcement or frame, which has to be embedded in a joining device, according to the invention.

The warp wire or threads 11 are to be observed. These warp threads 11 are constituted by one or several internal threads (two in the case considered) embedded in a plastic material. The weft wires or threads 13 have a certain elasticity in the length direction and are woven in a loose way, resulting form an operation which consists in lengthening the weft threads while shortening the warp threads.

It is understood that such a fabric, submitted to a tension in the transversal direction of the fabric (which corresponds to the longitudinal direction of the device in which it is incorporated) will lenghten elastically owing to the elasticity of the weft threads 13 and of that of the embedding elastic material of the warp threads 11, which when submitted to the pressure of the pulled weft -threads 13, which tends to reduce the amplitude of their sinuosities, is momentarily compressed.

When the tension is no more exerted, the fabric recovers its initial length. It is to be noted that the fabric presents a special texture in its central part. This texture, characterised by the loose loops 14 of the weft wire or threads 13, is provided for the frame 5 of the linking elements of the half devices. It will be explained herafter that these loops 14 are assembled to match with the shape of the linking elements 1. It is understood that, as in the case of all textile representation, the warp threads 11 and the weft threads 13 are shown spaced apart by distances much greater than the actual distance.

However, the reinforcements or frames can also be implemented using a knitted fabric or even a non woven fabric, presenting the required properties of elasticity.

Figure 5:
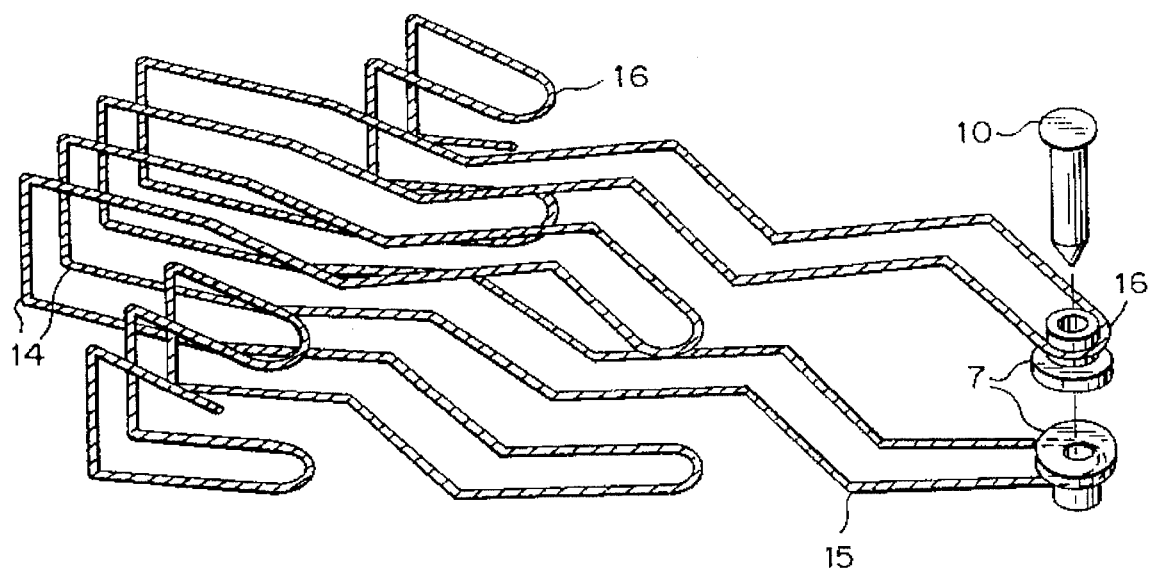
FIG. 5 is also a schematic view of another type of frame of the joining device according to the invention.

FIG. 5 represents another elastic frame comprising a cable arranged according to a three dimension pattern, intended to be sunk in the elastic material of the device (not shown for the clearness of the drawing). Advantageously, this cable surrounds by means of loops 16, washers or plugs 7, provided for fixing the wings to the conveyor belt 6. Only a couple of washers 7 and one rivet yet unthreaded across are shown, other loops 16 of the cable surrounding the washers which are not shown, and symbolically represented on the drawing by means of crosses. Free loops 14 of the cable are to be observed on the left hand side of the drawing. These free loops 14 are to be embedded in the elastic material forming the linking elements in a similar way to that of the weft threads of FIG. 4. It has to be noted also, that the cables 15 are arranged in a zigzag pattern. They can also form sinuosities (not shown). This arrangement is aimed for obtaining, in association with the material within which they are sunk, for instance a rubber, an elasticity which does not exist, or which exist in tiny amount, in the cables themselves.

Figure 6A:
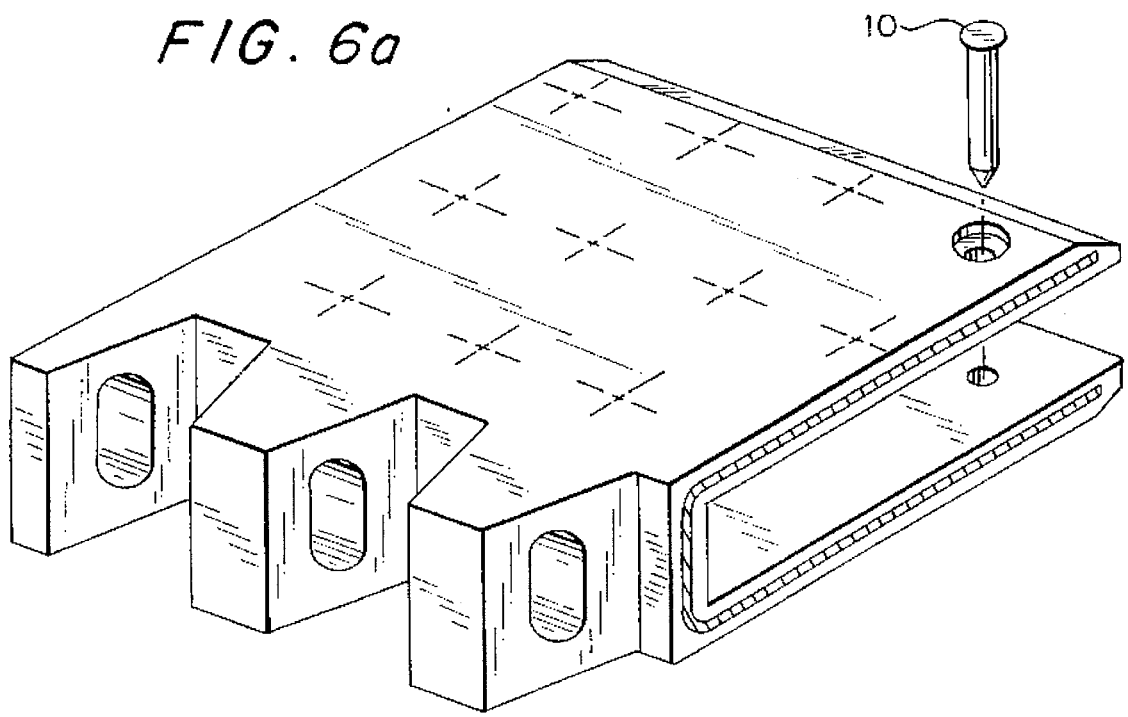
FIG. 6a is a schematic perspective view, with partial longitudinal cross-section of half of the device of an embodiment according to the invention.
Figure 6B:
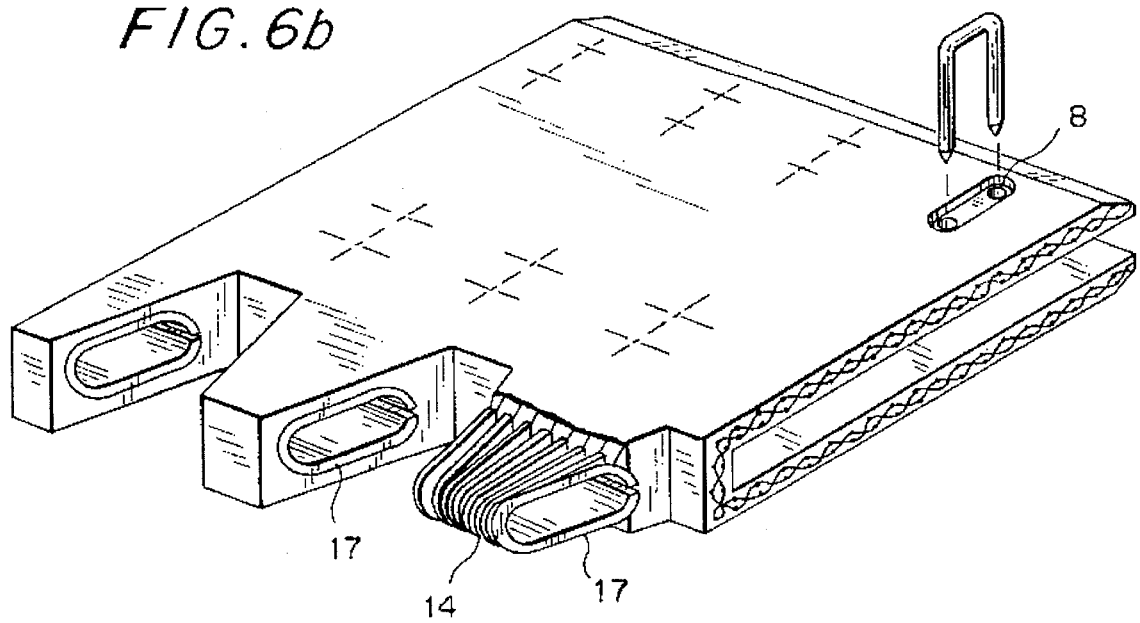
FIG 6b shows half of another half of the device, on an embodiment according to the invention.

FIGS. 6a and 6b show a schematic view of two embodiments of the invention. FIG. 6a shows a half device, the frame of which is made of a cable arranged as shown on FIG. 5, the attachment to the conveyor belt (not shown) being provided by rivets, one of which being shown. The crosses are a symbolic representation of the fixing holes fitted with washers for the passage of the rivets. Advantageously, they are set according to a staggered arrangement or according to any other arrangement in an attempt to prevent the setting of the fixing holes too close to each other on one same longitudinal line. FIG. 6b of shows a half device, the frame of which is made of an elastic fabric of the type shown on FIG. 4, the attachment being obtained by means of dual-point spikes threaded across a small plate 8 provided with two holes linked to the frame and sunk in the wings. A linking element is shown in sectional view, to expose the loops 14 of the fabric, assembled in order to match with the trapezoïdal shape of the linking element and surrounding a ring 17 the transversal section of which has a "race-course" shape. These rings 17 are provided for the reception of the linking stem which crosses successively and alternately through a ring 17 belonging to a linking element 1 of the series of linking elements of half a device, then through a ring 17 belonging to a linking element 1 part of a series of linking elements of the other half device and so on. These rings are in a metallic or plastic material. They are aimed to reinforce the internal part of the passage and to facilitate the threading across of the linking stems. They do not need being annular, i.e. completely closed. Effectively the rings 17 shown are splitted on their rear part.

Figure 7A:
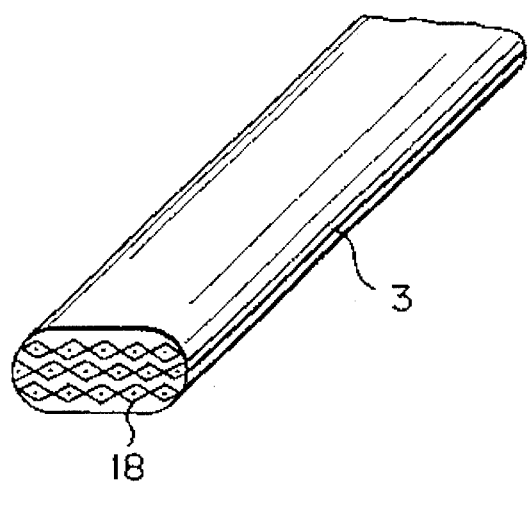
FIG. 7a–7d are perspective views with a partial cross-section of various forms of implementation of linking stems provided for joining devices according to the invention.
Figure 7B:
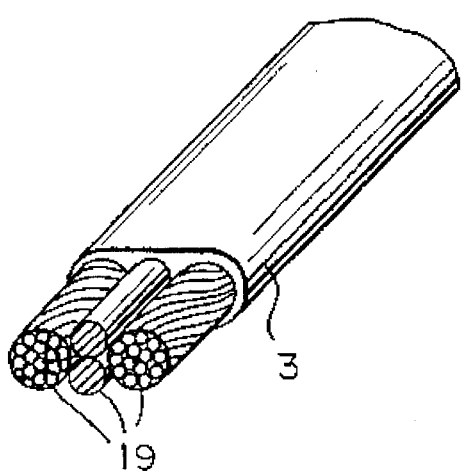
Figure 7C:
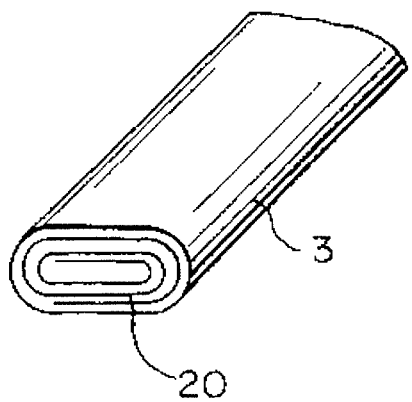
Figure 7D:
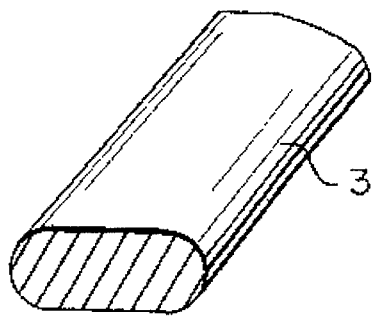

FIGS. 7a–d shows several structures proposed for making the linking stems 3. In FIG. 7a, the linking stem 3 is reinforced by means of a woven structure 18, sunk in hard rubber or in a plastic material which is able to resist to compression while being flexible. In FIG. 7b the linking stem 3 is armoured by means of cables 19. On FIG. 7c the linking stem 3 has no reinforcement but is made out of a material 20 reinforced by means of cut fibers arranged at random. In FIG. 7d the linking stem 3 is formed of an integral material.

Figure 8:
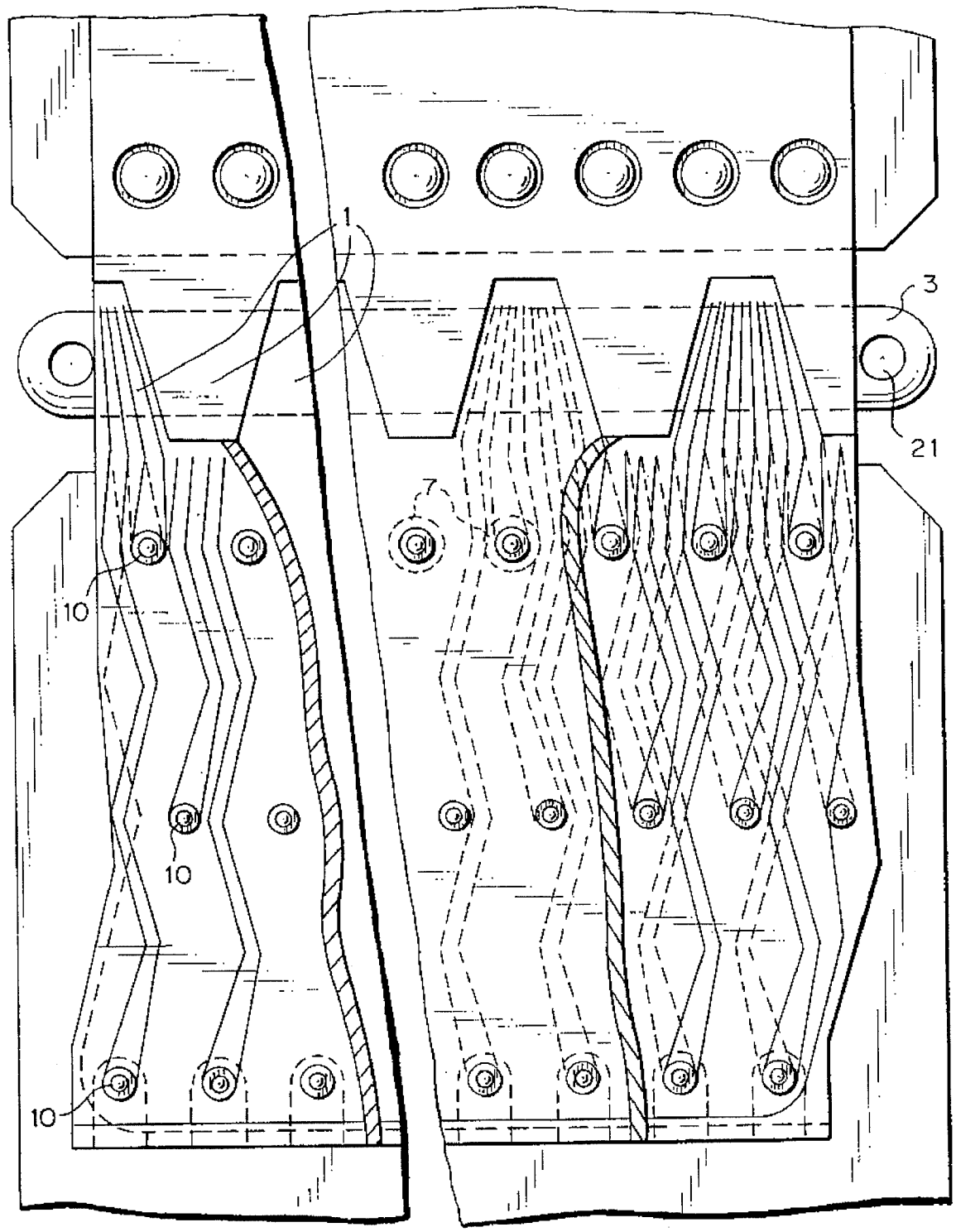
FIG. 8 represents a plan top "radiographic" view of a joining device according to the invention, which shows the structure of its internal frame.
Figure 9:
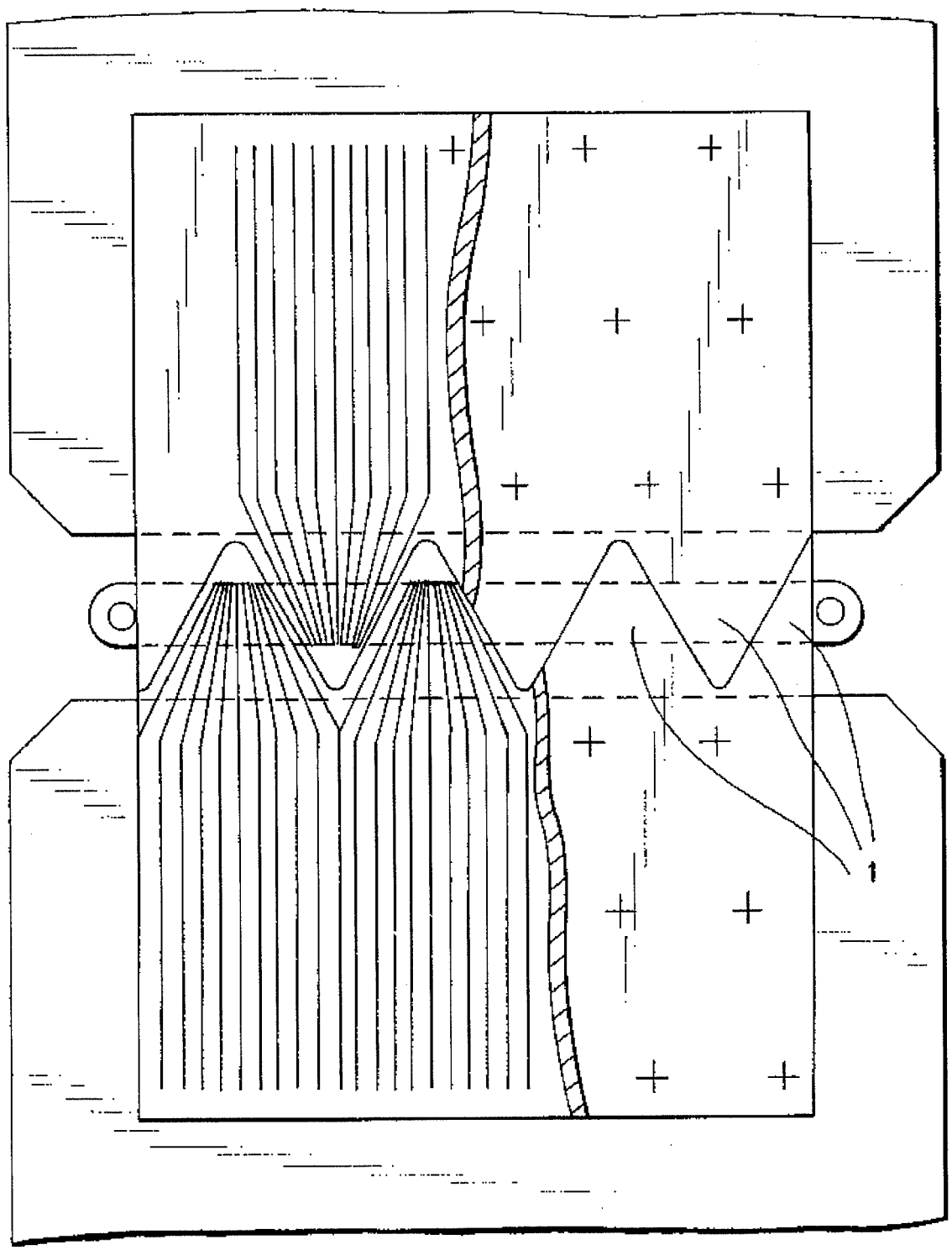
FIGS. 9 and 10 represent a plan top view, with partial cross-section along an intermediate plane parallel to the faces of a joining device according to the invention of two different embodiments of the invention.
Figure 10:
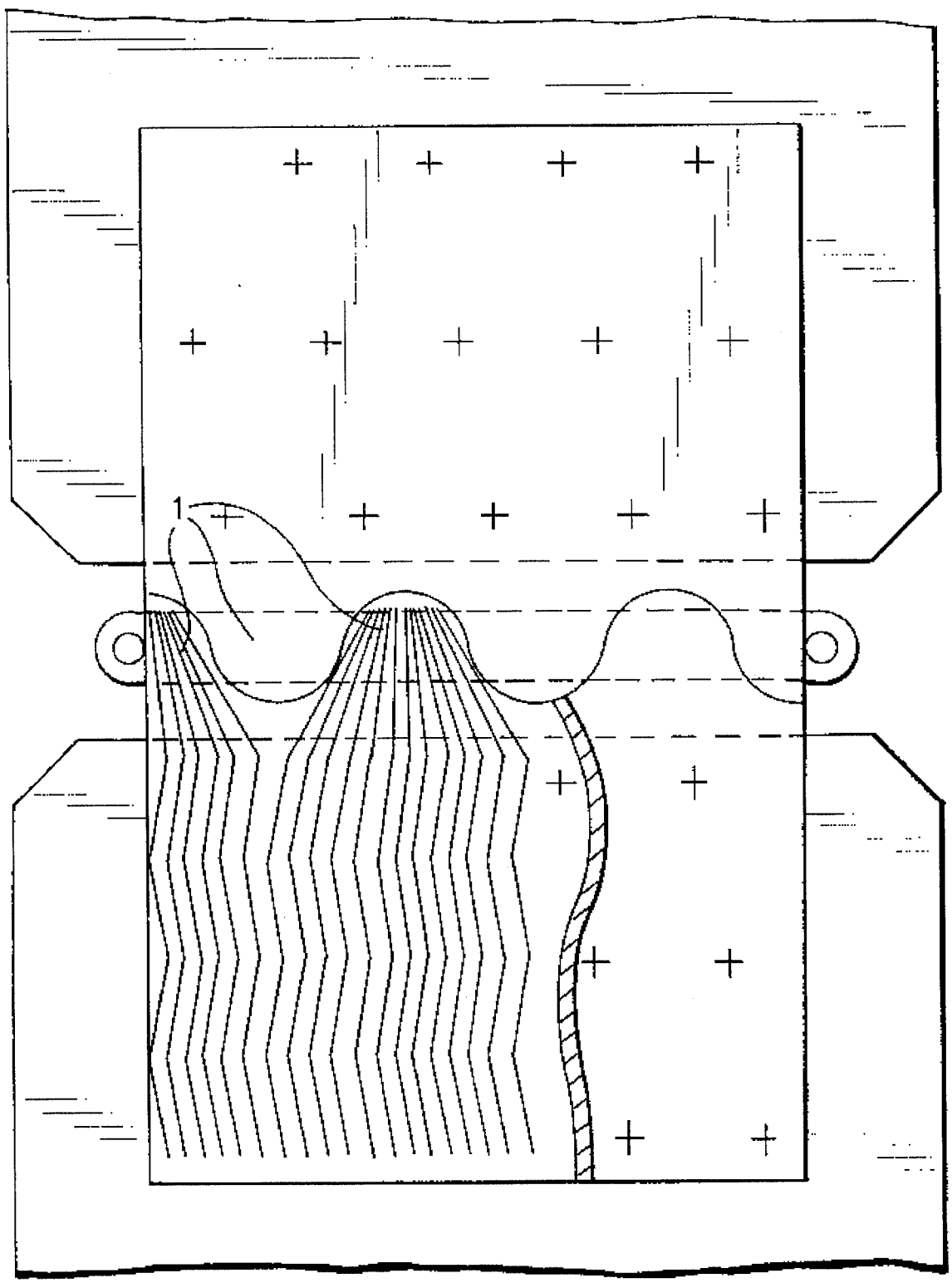

FIGS. 8, 9 and 10 are views from above, at least partially radiographic, of examples of devices according to the invention showing the internal reinforcement 5, the linking interleaved elements, the linking stem 3, the fixing washers 7 and the fixing rivets 10. It will be noted that the linking stem 3 is advantageously provided at its ends with holes 21 enabling its attachment or as the case may be to pull it by means of a hook or to push it in order to thread it across. These holes could be used also for the setting of locking pins.

On FIG. 8 the interleaved linking elements 1 have complementary trapezoïdal shapes, on FIG. 9 same have complementary triangular shapes and on FIG. 10 same have complementary sinusoïdal shapes. Since the device does not operate as a hinge, any complementary form is acceptable. If the shape complementarity is perfect, an almost tight device can be obtained, this being of great interest in many industrial applications.

FIGS. 11a and 11b shows a particular method of trimming the frame cables to fixing elements made up of small plates 8 rather than washers, the small plates being provided with a hole for the passage of the rivets or of the spikes. The free ends 22 of the cables are passed through other holes or slits 26, formed in the small plates, of a diameter slightly larger than the cable diameter and folded in U-shape, the arms of the U being well tightened. In the special case of FIGS. 11a and 11b, the small plates are shaped in such a way as to retain a cable or a thread transversally oriented. As it is clearly shown, the free ends are folded around this transversally oriented cable or thread and retained by the small plates, by using slots formed in these small plates to enable local access to the transversally oriented cable or thread. This transversally oriented cable or thread may be part of a frame. Since the frame is sunk or embedded in the rubber or in the plastic material, the free plies of the cables cannot slide and disengage from the small plate, the more that the cable has a close tight U-shape. This arrangement is particularly convenient in industrial applications since it avoids using a more intricate method for fixing the cable to the trimming plates, such as the use of clips or the tying of knots. Each through hole 2 for a stem is surrounded by the frame threads.

Figure 12:
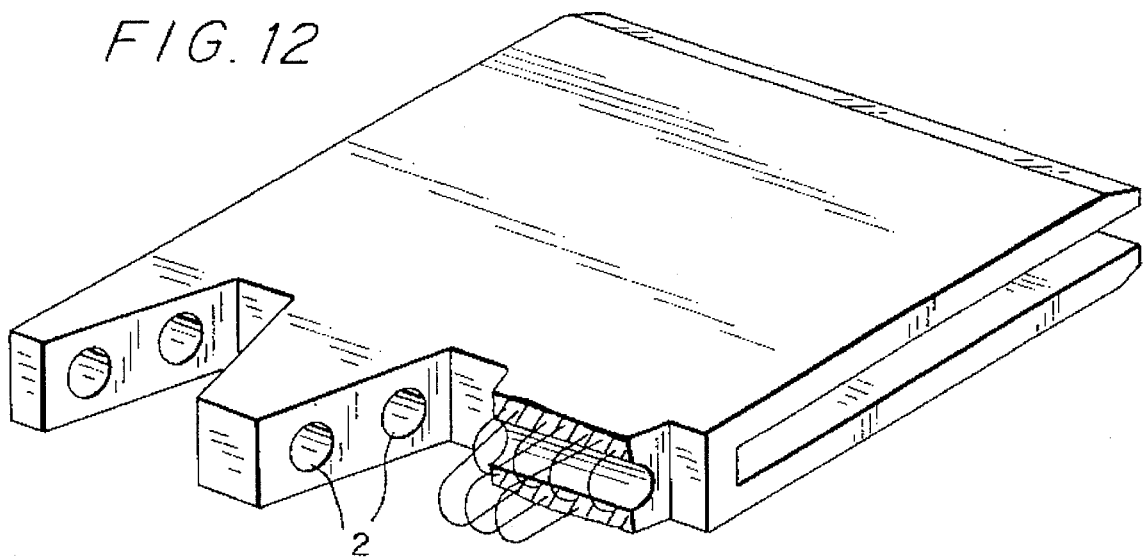
FIG. 12 is a perspective and partial sectional view of half of a joining device according to the invention comprising dual passage linking elements shifted longitudinally.

FIG. 12 shows a half joining device the linking elements of which, comprise each one two round passages for the passage of two linking stems 3 of round transversal cross-section. Owing to the provision of two stems the joining device according to the invention is not affected by the hinge effect.

Figure 13:
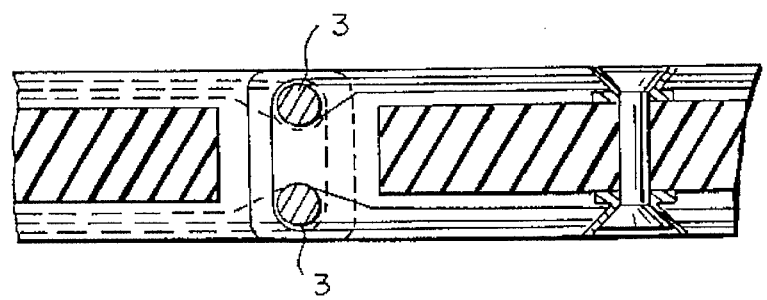
FIG. 13 is a longitudinal cross-section of a joining device according to the invention connected by means of two round stems.
Figure 14:
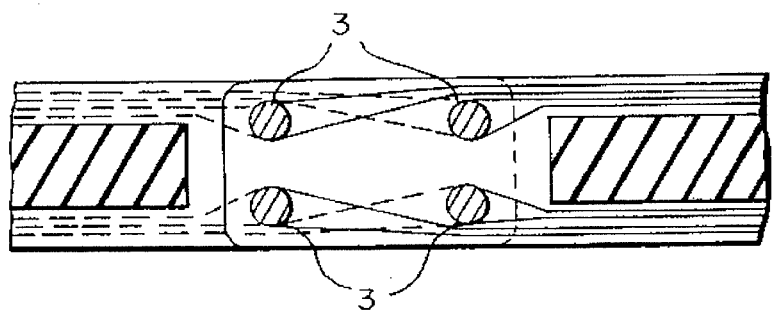
FIG. 14 is a longitudinal cross-section of a joining device according to the invention connected by means of four round stems.

FIGS. 13 and 14 show joining devices according to the invention having respectively two linking stems and four linking stems. In the case of the joining device of FIG. 13, three layer frames are used: a frame layer surrounds the upper through hole 2 of the linking element; another frame layer surrounds the lower through hole 2 of the linking element and the third frame layer surrounds the two through holes or passages 2.

In the case of FIG. 14, four frame layers are provided, each layer surrounding a through hole 2.

Figure 15:
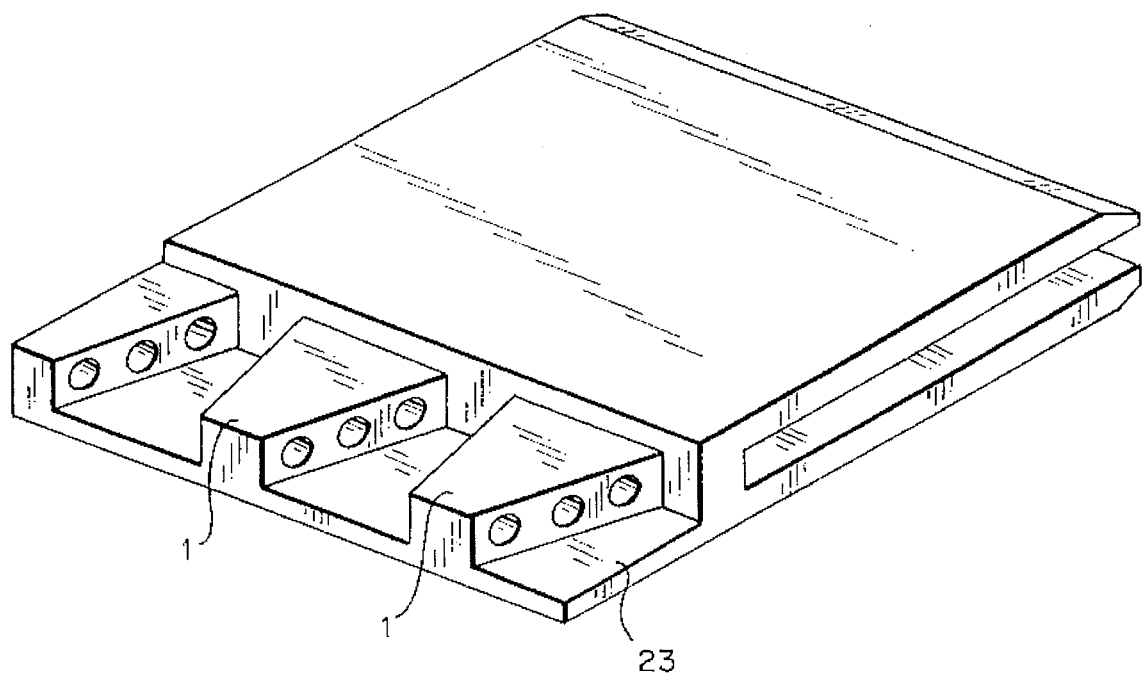
FIG. 15 is a perspective view of half of a joining device according to the invention forming a part of a-tight joining device.
Figure 16:
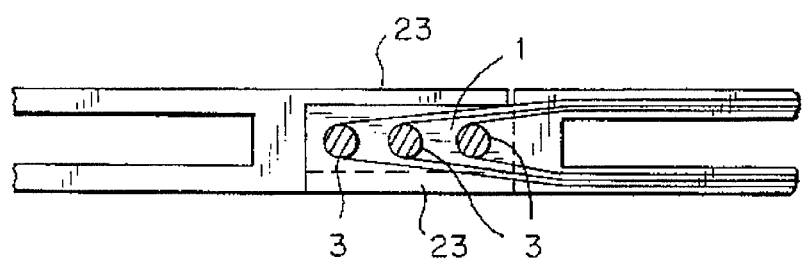
FIG. 16 is a longitudinal cross-section of the joining device according to the invention, shown on FIG. 15, connected by means of linking stems.

FIGS. 15 and 16 show a particular type of joining device according to the invention under the form of a half joining device. It will be noted that the linking elements overlap in 23 the whole length of the joining device, a recess being provided on the other side for receiving the complementary overlap 23 of the other half joining device. One can realise that these two overlaps 23, form together with the linking interleaved elements 1 located therebetween, a two stage tight barrier thanks to the intricate baffle thus obtained.

FIG. 17 represents a method for trimming the free ends of the frame threads or cables in the case where a joining device according to the invention form a single unit with the conveyor belt. The threads or cables, coming from the frame of the conveyor itself are folded around the through holes of the linking elements in view of the moulding or the vulcanization of these latter at the end of the conveyor belt and threaded across small slotted plates 24 similar to those used in the cloth industry to brake the straps of clothes. The threads or cables are thus crossed before moulding or vulcanizing the material which makes up the joining device, this latter thus, contributing his share, in retaining the free ends thus exposed.

Yet, these braking devices may be omitted as the case may be, if the ends are folded over a big length; in this case the material itself overmoulded or overvulcanized on these folded free ends, retain these latter efficiently. The same principle can be applied in the same way for the joining devices according to the invention inserted with fixing wings, provided these latter are sufficiently long in the longitudinal direction to enable an effective retention by the material of the free ends folded over this big length.

Also, these threads or cables can be twisted before moulding or vulcanizing, or can be provisionally fixed inside the mould by a mechanical means, for instance by pinching them provisionally, pending the final retention by the moulded or vulcanized material.

The fixing of the joining device wings is not carried out necessarily by means of rivets or spikes or of any other mechanical element crossing the wings and the conveyor belt. Owing to the large surface of the wings and since their elasticity is comparable to that of the conveyor belt, a sticking under cold conditions can be carried out, and even a vulcanization can be envisaged, which can be carried out during an operation shorter than a direct junction obtained by vulcanizing the ends of the conveyor belt according to the previous art.

It appears from the above description that all the objects aimed by the invention are reached thanks to the various embodiments described.

I claim:

1. A joining device for a conveyor belt, said device having linking elements each having an internal surface defining a hollow part, said linking elements being aligned on the external edge of two half joining devices, each joining device of said joining devices being solidly linked to a respective end of the conveyor belt, said linking elements being arranged to receive a linking stem which is passed transversely and alternatively through a linking element of said linking elements belonging to one of said half joining devices, then through a linking element of said linking elements belonging to another of said half joining devices, and so on, the half joining devices being brought close to each other in order to overlap the linking elements on each said joining device, said joining device being formed from a flexible and elastic material comprising an internal frame or reinforcement designed for surrounding over approximately 180° of the hollow part of the linking elements used as a passage for the linking stems at a distance from the surface of the linking elements or flush with said surface, said joining device having flexible fastening arms in which the reinforcement extends, wherein the flexibility and the elasticity of the internal frame or reinforcement is in the same range as those of said material.

2. The joining device according to claim 1, wherein the flexible fastening arms comprise fastening holes for the fastening arms, said holes lined by means of washers or sockets or by means of small bars incorporated in the arms.

3. The joining device according to claim 2, wherein the reinforcement is trimmed to the washers, sockets or the small bars.

4. The joining device according to claim 3, wherein at the ends of the arms, small protective bars are incorporated in the arms, the edge of the said small bars forming a bevelled bent down rim to meet a surface of the arms located at the opposite side of an end surface of the conveyor belt.

5. The joining device according to claim 3, wherein the reinforcement is made up of a knitted fabric.

6. The joining device according to claim 1, comprising a woven reinforcement, wherein a reinforcement fabric comprises warp threads made up of one or several internal threads embedded in an elastic material; weft thread producing a longitudinal elasticity and being woven loosewise and loosened with respect to the warp threads;

the reinforcement fabric being formed so the weft threads are arranged in the longitudinal direction with respect to the joining devices.

7. The joining device according to claim 1, wherein cables which constitute the reinforcement are arranged in a zigzag shape or with sinuosities, this arrangement allowing them, in association with the material in which they are embedded, an elasticity higher than that allowed by their actual constituent material.

8. The joining device according to claim 1, wherein the linking stem is reinforced by means of a wrapping canvas.

9. The joining device according to 3, wherein the trimming of cables is achieved by forming loops which partially surround the washers or the sockets lining the holes.

10. The joining device according to claim 3, wherein trimming of cables is achieved by passing free strands through holes provided in the small bars lining a fastening hole and by folding them tightly in the opposite direction, the free strands being trapped by the constituent material.

11. The joining device according to claim 10, wherein the free cable strands pass around a cable or a thread arranged in the transversal direction and retained by the small bars, by using notches cut out in the small bars and allowing local access to the cable or thread, arranged in the transversal direction, whether or not part of this reinforcement.

12. The joining device according to claim 3, wherein the trimming is obtained by means of holes provided in the reinforcement, which is either a knitted fabric, or a woven fabric or a non woven fabric, the washers or sockets being engaged in the said holes provided in the reinforcement.

13. A joining device for a conveyor belt, said device having linking elements each having an internal surface defining a hollow part, said linking elements being aligned on the external edge of two half joining devices, each joining device of said joining devices being solidly linked to a respective end of the conveyor belt, said linking elements being arranged to receive a linking stem which is passed transversely and alternatively through a linking element of said linking elements belonging to one of said half joining devices, then through a linking element of said linking elements belonging to another of said half joining devices, and so on, the half joining devices being brought close to each other in order to overlap the linking elements on each said joining device, said joining device being formed from a flexible and elastic material comprising an internal frame or reinforcement designed for surrounding over approximately 180° of the hollow part of the linking elements used as a passage for the linking stems at a distance from the surface of the linking elements or flush with said surface, said joining device having flexible fastening arms in which the reinforcement extends, wherein the flexibility and the elasticity of the internal frame or reinforcement is in the same range as those of said material;

wherein the reinforcement is made up of a knitted fabric.

14. A joining device for a conveyor belt, said device having linking elements each having an internal surface defining a hollow part, said linking elements being aligned on the external edge of two half joining devices, each joining device of said joining devices being solidly linked to a respective end of the conveyor belt, said linking elements being arranged to receive a linking stem which is passed transversely and alternatively through a linking element of said linking elements belonging to one of said half joining devices, then through a linking element of said linking elements belonging to another of said half joining devices, and so on, the half joining devices being brought close to each other in order to overlap the linking elements on each said joining device, said joining device being formed from a flexible and elastic material comprising an internal frame or reinforcement designed for surrounding over approximately 180° of the hollow part of the linking elements used as a passage for the linking stems at a distance from the surface of the linking elements or flush with said surface, said joining device having flexible fastening arms in which the reinforcement extends,

- wherein the flexibility and the elasticity of the internal frame or reinforcement is in the same range as those of said material;
- wherein a reinforcement fabric comprises warp threads made up of one or several internal threads embedded in an elastic material; weft thread producing a longitudinal elasticity and being woven loosewise; and loosened with respect to the warp threads;
- the reinforcement fabric being formed so the weft threads are arranged in the longitudinal direction with respect to the joining devices.

* * * * *